(12) United States Patent
Studt et al.

(10) Patent No.: US 6,594,614 B2
(45) Date of Patent: *Jul. 15, 2003

(54) VEHICLE BACK-UP AID SYSTEM

(75) Inventors: David Glen Studt, Noblesville, IN (US); Ronald Melvin Taylor, Greentown, IN (US)

(73) Assignee: Delphi Technologies, Inc., Troy, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 35 days.

(21) Appl. No.: 09/550,122

(22) Filed: Apr. 17, 2000

(65) Prior Publication Data

US 2003/0055596 A1 Mar. 20, 2003

(51) Int. Cl.$^7$ .............................. G06F 15/00
(52) U.S. Cl. ................. 702/150; 702/143; 702/149; 340/435; 340/903; 180/167; 180/168
(58) Field of Search ................. 702/150, 143, 702/159; 340/435, 903, 436, 691.1, 691.3, 691.4, 691.6, 904, 943, 935, 936, 901; 180/169, 167, 271, 274; 900/300, 301

(56) References Cited

U.S. PATENT DOCUMENTS 5,314,037 A * 5/1994 Shaw et al. ............... 180/169
5,754,123 A * 5/1998 Nashif et al. ............. 340/435
6,281,786 B1 * 8/2001 Adachi et al. ............ 340/435

* cited by examiner

Primary Examiner—John Barlow
Assistant Examiner—Stephen Cherry
(74) Attorney, Agent, or Firm—Jimmy L. Funke

(57) ABSTRACT

A warning system that warns an operator of an impending collision with an object while the operator is backing up. The system scans behind the vehicle with an emitter/sensor system and determines a time-to-collision with the object based on distance to the object and vehicle speed. Based upon the time-to-collision, a simple combination of visual and audio signals is designed to let the operator known of the imminency of a collision with the object so that the operator may react and make appropriate countermeasures.

22 Claims, 3 Drawing Sheets

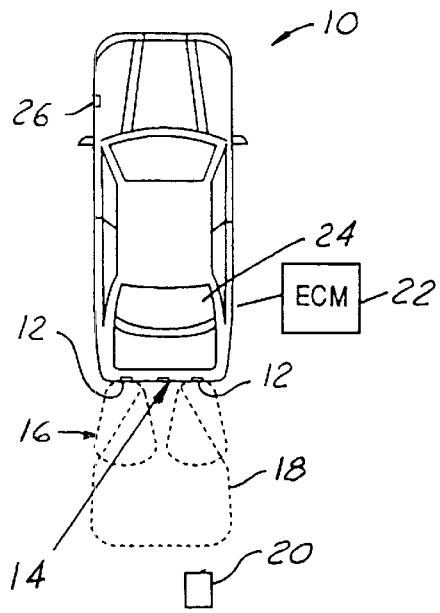
FIG. 1
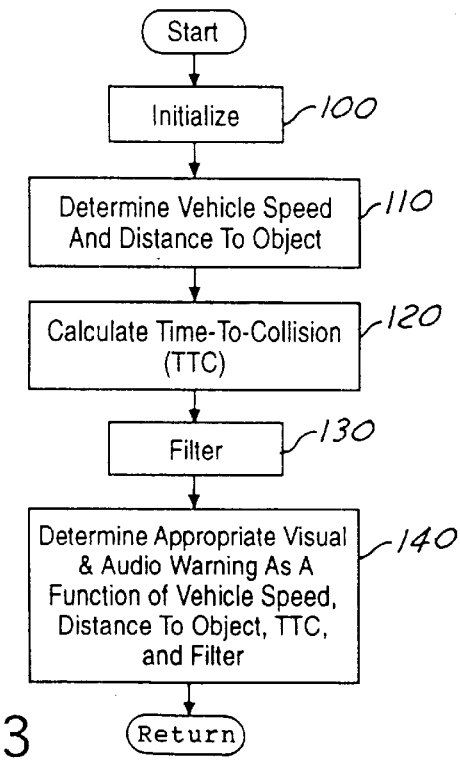
FIG. 3
| Bin # | Reported Measurement (cm) | Reported Measurement (ft) | Bin # |
|---|---|---|---|
| 1 | 0 - < 22 (includes dead zone) | 0 - < 0.722 (includes dead zone) | 1 |
| 2 | 22 - < 51 | 0.722 - < 1.673 | 2 |
| 3 | 51 - < 80 | 1.673 - < 2.625 | 3 |
| 4 | 80 - < 109 | 2.625 - < 3.576 | 4 |
| 5 | 109 - < 138 | 3.576 - < 4.528 | 5 |
| 6 | 138 - < 167 | 4.528 - <5.479 | 6 |
| 7 | 167 - < 196 | 5.479 - <6.430 | 7 |
| 8 | 196 - < 225 | 6.430 - < 7.382 | 8 |
| 9 | 225 - <254 | 7.382 - < 8.333 | 9 |
| 10 | 254 - <283 | 8.333 - < 9.285 | 10 |
| 11 | 283 - < 312 | 9.285 - < 10.236 | 11 |
| 12 | 312 - < 341 | 10.236 - < 11.188 | 12 |
| 13 | 341 - < 370 | 11.188 - < 12.139 | 13 |
| 14 | 370 - < 399 | 12.139 - <13.091 | 14 |
| 15 | 399 - < 428 | 13.091 - < 14.042 | 15 |
| 16 | 428 - < 457 | 14.042 - < 15.000 | 16 |
| Undefined | >457 | > 15.0 | Undefined |
FIG. 2

|  |  |  | Speed (mph) (top line) | | | | | | | | | | |
|---|---|---|---|---|---|---|---|---|---|---|---|---|---|
| Bin # | Distance (m) | Distance (ft) | Parking Mode | | | Reversing mode (speed > 2 mph) | | | | | | | | |
| 1 | 0.15 | 0.5 | P1 | P1 | P1 | R1 | R1 | R1 | R1 | R1 | R1 | R1 | R1 |
| 2 | 0.30 | 1 | P1 | P1 | P1 | R1 | R1 | R1 | R1 | R1 | R1 | R1 | R1 |
| 3 | 0.61 | 2 | P2 | P2 | P2 | R1 | R1 | R1 | R1 | R1 | R1 | R1 | R1 |
| 4 | .091 | 3 | P3 | P3 | P3 | R1 | R1 | R1 | R1 | R1 | R1 | R1 | R1 |
| 5 | 1.22 | 4 | P3 | P3 | P3 | R1 | R1 | R1 | R1 | R1 | R1 | R1 | R1 |
| 6 | 1.52 | 5 | P4 | P4 | P4 | R2 | R1 | R1 | R1 | R1 | R1 | R1 | R1 |
| 7 | 1.83 | 6 | P4 | P4 | P4 | R2 | R2 | R1 | R1 | R1 | R1 | R1 | R1 |
| 8 | 2.13 | 7 | P4 | P4 | P4 | R3 | R2 | R1 | R1 | R1 | R1 | R1 | R1 |
| 9 | 2.44 | 8 | P4 | P4 | P4 | R3 | R2 | R2 | R1 | R1 | R1 | R1 | R1 |
| 10 | 2.75 | 9 | P5 | P5 | P5 | R3 | R3 | R2 | R2 | R1 | R1 | R1 | R1 |
| 11 | 3.05 | 10 | P5 | P5 | P5 | R4 | R3 | R2 | R2 | R1 | R1 | R1 | R1 |
| 12 | 3.35 | 11 | P5 | P5 | P5 | R4 | R3 | R3 | R2 | R2 | R1 | R1 | R1 |
| 13 | 3.66 | 12 | P5 | P5 | P5 | R4 | R3 | R3 | R2 | R2 | R2 | R1 | R1 |
| 14 | 3.96 | 13 | P6 | P6 | P6 | R4 | R4 | R3 | R2 | R2 | R2 | R1 | R1 |
| 15 | 4.27 | 14 | P6 | P6 | P6 | R5 | R4 | R3 | R3 | R3 | R2 | R2 | R1 |
| 16 | 4.57 | 15 | P6 | P6 | P6 | R5 | R4 | R3 | R3 | R3 | R2 | R2 | R2 |
| NA | 4.88 | 16 | P6 | P6 | P6 | R5 | R4 | R4 | R3 | R3 | R2 | R2 | R2 |
| NA | 5.18 | 17 | P6 | P6 | P6 | R5 | R4 | R4 | R3 | R3 | R2 | R2 | R2 |

Parking Mode (Speed < 2 mph)
P1 = Nearest target is in Bins 1 or 2
P2 = Nearest target is in Bins 3
P3 = Nearest target is in Bins 4 - 5
P4 = Nearest target is in Bins 6 - 9
P5 = Nearest target is in Bins 10 - 13
P6 = Nearest target is in Bins 14 - 16

Reversing Mode (Speed > 2 mph)
R1 = Imminent warning 3 (for TTC < 1.0 seconds)
R2 = Imminent warning 2 (for 1.0 < TTC < 1.5 seconds)
R3 = Imminent warning 1 (for 1.5 < TTC < 2 seconds)
R4 = Cautionary warning 3 (for 2 < TTC < 3 seconds)
R5 = Cautionary warning 2 (for 3 < TTC < 4 seconds)
R6 = Cautionary warning 1 (for 4 < TTC < 5 seconds)
WN = No warning (for TTC > 5 seconds)

FIG.4

| Warning Levels | #1 Audio | #1 Visual | #2 Audio | #2 Visual | #3 Audio | #3 Visual | #4 Audio | #4 Visual | #5 Audio | #5 Visual | #6 Audio | #6 Visual | #7 Visual | #8 Visual | Audio Duty Cycle | LED Groups |
|---|---|---|---|---|---|---|---|---|---|---|---|---|---|---|---|---|
| R6 | 5 Hz | solid | 2 Hz | 2 Hz | 3 Hz | 3 Hz | 2 Hz | 2 Hz | 5 Hz | 5 Hz | 2 Hz | 2 Hz | solid | 10 | 66% | I, M, O |
| R5 | 5 Hz | solid | 3 Hz | 3 Hz | 6 Hz | 6 Hz | 4 Hz | 4 Hz | 5 Hz | 5 Hz | 5 Hz | 5 Hz | solid | 10 | 66% | I, M, O |
| R4 | 10 Hz | solid | 4 Hz | 4 Hz | 9 Hz | 9 Hz | 6 Hz | 6 Hz | 5 Hz | 5 Hz | 10 Hz | 10 Hz | solid | 10 | 66% | I, M, O |
| R3 | 10 Hz | solid | 5 Hz | 5 Hz | 12 Hz | 12 Hz | 8 Hz | 8 Hz | 10 Hz | 10 Hz | solid | solid | 10 | solid | 66% | I, M, O |
| R2 | solid | 5 Hz | 10 Hz | 10 Hz | 15 Hz | 15 Hz | 10 Hz | 10 Hz | 10 Hz | 10 Hz | solid | solid | 10 | solid | 66% | I, M, O |
| R1 | solid | 5 Hz | solid | solid | solid | solid | 15 Hz | 15 Hz | solid | solid | solid | solid | 10 | solid | 66% | I, M, O |
| P6 | none | solid | 2 Hz | 2 Hz | 3 Hz | 3 Hz | 2 Hz | 2 Hz | 5 Hz | 5 Hz | 2 Hz | 2 Hz | solid | 10 | 33% | — |
| P5 | 2 Hz | solid | 3 Hz | 3 Hz | 6 Hz | 6 Hz | 4 Hz | 4 Hz | 5 Hz | 5 Hz | 5 Hz | 5 Hz | solid | 10 | 33% | — |
| P4 | 5 Hz | solid | 4 Hz | 4 Hz | 9 Hz | 9 Hz | 6 Hz | 6 Hz | 5 Hz | 5 Hz | 10 Hz | 10 Hz | 10 | 10 | 33% | I, M |
| P3 | 8 Hz | solid | 5 Hz | 5 Hz | 12 Hz | 12 Hz | 8 Hz | 8 Hz | 10 Hz | 10 Hz | solid | solid | 10 | solid | 33% | I, M |
| P2 | 10 Hz | solid | 10 Hz | 10 Hz | 15 Hz | 15 Hz | 10 Hz | 10 Hz | 10 Hz | 10 Hz | solid | solid | 10 | solid | 33% | I, M |
| P1 | solid | solid | solid | solid | solid | solid | 15 Hz | 15 Hz | solid | solid | solid | solid | 10 | solid | 33% | I, M, O |

I = Inner LED Group
M = Middle LED Group
O = Outer LED Group

FIG. 5

VEHICLE BACK-UP AID SYSTEM

TECHNICAL FIELD

The present invention relates to warning systems and, more specifically, vehicle back-up aid systems for collision avoidance.

BACKGROUND OF THE INVENTION

Warning systems are being used today to alert vehicle operators of objects that may be a collision hazard when vehicles are backing up. Warning systems are also used as aids in precise parking maneuvers. Warning systems are desirable to minimize or avoid vehicle damage that may otherwise occur. Conventional warning systems are designed to give vehicle operators an audio or visual warning of an impending or potential collision with sufficient lead-time such that the vehicle operator can react to the warning and make appropriate countermeasures to prevent the collision.

Typically, such reverse sensing systems provide alerts to operators based on the relationship between the operator's vehicle and a detected object. Conventional back-up aid systems, however, only alert the operator of a detected objected. The alert provided is not related to distance and the vehicle speed. The vehicle operator must, therefore, assess the seriousness of the alert without guidance from the back-up aid system. In other words, the alert does not inform the operator if the object is, for example, two feet away and rapidly approaching, or ten feet away and slowly approaching. Thus, conventional system alerts can be confusing, and operators may not process the alert quick enough to make appropriate countermeasures.

SUMMARY OF THE INVENTION

The present invention utilizes both distance to the nearest object and speed of the vehicle to determine time-to-collision (TTC) and give an appropriate warning based on this determined TTC. The warning system of the present invention communicates useful information to the driver by eliminating, for example, long range, low speed nuisance alarms. The present invention provides a hierarchical warning structure by informing a vehicle operator of the existence of an imminent crash warning, defined as the potential for a TTC within approximately 2 seconds; or a cautionary danger, defined as a TTC between approximately 2 to 5 seconds. Visual or audio warnings, or both, are provided so that the operator can take appropriate countermeasures.

The present invention is accomplished by providing a detection system that sweeps a predetermined area for objects. A control module having a microprocessor interprets the vehicle back-up speed and the location of any objects as sensed by the sweeps to determine the imminency of a potential collision. Based upon the imminency of a collision, a visual or audio signal, or both, is provided to the vehicle operator. In this way, the vehicle operator will be able to determine an appropriate countermeasure to prevent the collision without the need to additionally process the imminency of the potential collision.

BRIEF DESCRIPTION OF THE DRAWINGS

The present invention will now be described, by way of example, with reference to the accompanying drawings, in which:

FIG. 1 is a perspective view showing the arrangement of emitter/sensors, driver alert displays, and field coverage according to a preferred embodiment of the present invention;

FIG. 2 is a table indicating bin definition used to determine object distance from the emitter/sensors;

FIG. 3 is a logic flow diagram for determining the proper audio and visual back-up warning according to a preferred embodiment;

FIG. 4 is a table summarizing the various audio and visual warnings to be given as a function of bin number, mode (parking or reversing) and vehicle back-up speed; and FIG. 5 is a table indicating the audio and visual warnings corresponding to the parking and reversing mode warning levels of FIG. 4.

DESCRIPTION OF THE PREFERRED EMBODIMENT

Referring to FIG. 1 a vehicle 10 is shown having a pair of ultrasonic emitter/sensors 12 and a radar emitter/sensor 14. According to a preferred embodiment of the present invention, the ultrasonic emitter/sensors 12 are packaged in the rear bumper (not shown) so that the emitting face is flush with the bumper and located about ⅔ of the distance from the centerline of the vehicle 10. Preferably, the radar emitter/sensor 14 is packaged behind the rear bumper (assuming a plastic bumper) in the center (above or below the license plate) at a distance within approximately 3 inches (7.5 cm) from the primary bumper material. The ultrasonic emitter/sensors 12 and radar emitter/sensor 14 are mounted such that their respective centerlines are between approximately 15 and 30 inches (between 38 and 76 cm) above the ground, with approximately 20–24 inches (50–62 cm) being preferred. The vehicle 10 also contains various sensors such as a wheel speed sensor 26 for determining vehicle speed.

The ultrasonic emitter/sensors 12 and radar emitter/sensor 14 each emit a signal (preferably around 40 KHz for the ultrasonic emitter/sensor 12 and around 17 GHz for the radar emitter/sensor 14) to cover a specific area behind the vehicle to sweep for objects. Near field coverage (up to about 1.5 meters), designated by reference numeral 16, is accomplished by each ultrasonic emitter/sensor 12, while far field coverage (up to 6 meters), designated by reference numeral 18, is accomplished by the radar emitter/sensor 14.

Of course, numerous alternative emitter/sensor arrangements that are well known are contemplated by the present invention. For example, optical sensors may be used. Preferably, however, the sensor arrangement allows for determining the relative distance to a detected object as described below.

When an object 20 appears within the near field coverage 16 or far field coverage, the signals sent out by the emitter/sensor 12, 14 are reflected from the object and returned to the emitter/sensors 12, 14. The mechanism for sending and receiving signals from ultrasonic emitter/sensors 12 and radar emitter/sensors is well known in the art. Also, sensors such as a wheel speed sensor 26 send signals regarding vehicle speed. The returned signals are then processed by an electronic control module 22, preferably microprocessor-based, to determine the distance between the object 20 and the vehicle 10. The electronic control module 22 accounts for vehicle back-up speed to determine an approximate time-to-collision (TTC). As will be described in further detail below, a series of audio and visual alerts emanating from a driver alert display 24 will warn the operator of the vehicle 10 of an impending collision. The visual driver alert display 24 is preferably mounted in the rear of the vehicle 10 such that the operator can see it when she looks over her shoulder and is visible through the rear view mirror (not shown). Alternatively, the driver alert display 24 is mounted near the primary rear-view mirror (not shown) such that the vehicle operator can quickly view the display 24 while using the primary rear-view mirror. The audio driver alert display preferably comprises circuitry for generating tones, such as a speaker, and is mounted within the vehicle 10 such that the operator can hear the audio response anywhere within the vehicle 10. The display 24 preferably comprises several visual indicators such as light-emitting diodes (LED). The LEDs may be of different colors. For example, they may be red, yellow, or green to correspond to the severity of the TTC.

During system implementation for a particular vehicle 10, a determination must first be made as to how to report and arrange the information provided by the emitter/sensors 12, 14 in the control module 22. As such, first a determination is made as to the field of coverage. As noted above, the far field coverage 28 of the radar emitter/sensor extends to approximately 6 meters (20feet). As such, a preferred embodiment of the present invention conservatively uses 4.57 meters (15 feet) as a benchmark for making measurements.

Next, specific range zones, or bins are determined. The size of a bin is a function of various practical factors, including the accuracy and differentiating ability of the sensing equipment, the processing ability of the control module 22, and sensor costs. As such, the size of the bins can vary from small to large, depending upon the desired characteristics for the system. As shown in FIG. 2, a preferred bin size for the present invention is approximately 29 centimeters, with 16 defined range zones. The bin arrangement of the present invention includes a dead zone (the area very close to the bumper) in bin 1, where the sensors/emitters 12, 14 are unable to make accurate readings.

Next, a determination is made as to the cycle time for each successive sweep of the sensor/emitters 12, 14. Cycle times defined as the minimum time between repeated distance reporting and alarm activation sequences, are set to be consistent with human reaction time and the expected delay associated with system initialization at the beginning of the operator engaging the gear. Such values are determinable through experimentation and sensor selection by known methods. Preferably, an initial scan should be completed with 250–500 msec of the operator engaging reverse gear, followed by subsequent scans in the 125+/−25 msec range.

Referring now to FIG. 3, a logic flow diagram indicates the mechanism for determining which, if any, audio and visual warning should be given to a operator when backing up a vehicle and determining the preliminary criteria for the establishing the criteria for the warning.

First, in Step 100, data concerning objects 20 is initialized. An initial near field 16 and far field 18 scan by the emitter/sensors 12, 14 for objects 20 is preferably completed with 250–500 msec of the vehicle operator engaging reverse gear. These initial readings are stored in the electronic control module 22 and may used in subsequent steps of determining vehicle speeds and filtering.

Then, in Step 110, various sensors such as a wheel speed sensor 26 determine vehicle speed. At this time, the distance to a detected object 20 is also determined by the engine control module 22 as a function of inputs from the sensors 12, 14. Each individual sensor 12, 14 transmits values to the electronic control module 22 during each successive sweep.

In Step 120, the information generated for vehicle speed and distance to target object 20 in Step 110 is used to calculate a TTC (time-to-collision) value with the target object 20. TTC is calculated for each sensor 12, 14 during each successive sweep. The TTC value is calculated as a rate of change of distance to target object 20 and as a function of the minimum value that each individual sensor 12, 14 transmits for distance to target object 20 per sweep. For instance, if the radar emitter/sensor on the left side of a vehicle reads the distance to the object as 2 meters and the emitter/sensor on the right side reads the distance as 4 meters, an individual TTC value will be calculated for both the 2 meter distance and the 4 meter distance, by the lower TTC value associated with the 2 meter distance will be used to possibly generate a warning.

Next, in Step 130, the distance to a detected object sweep information is filtered by the electronic control module 22. Filtering is necessary to limit or eliminate false signals of objects and to remove potential warnings when an object is removed from the scanning area. False alarms or the removal of potential alarms will occur when the M/N ratio (where M is a "hit" on a particular sensor 12, 14 cycle, N is the number of successive sensor 2, 14 cycles) is equal to 1:4 or less. The filtering procedure is a continual process occurring while the vehicle 10 is a reverse gear.

First, the sensor/emitters 12, 14 will scan the appropriate fields. When an object 20 is detected by the sensors 12, 14, the M/N ratio equals 1:1, a TTC is calculated as described in Step 120, and an appropriate alarm is determined as described in Step 140 below. For each successive sweep that the object 20 remains within the field of the sensor 12, 14, the M/N ratio will remain equal to 1:1. The first sweep that the object 20 is not detected by any sensor 12, 14 will change the M/N ratio to 1:2. At this point, a TTC will still be calculated and an appropriate warning determined. The second sweep that the object 20 is not detected will change the M/N ration to 1:3. Again, at this point, a TTC will be calculated and an appropriate warning determined. The object 20, as in a preferred embodiment of the present invention, will continue to trigger the appropriate warning alarm until M/N is equal to 1:4. At this point, the target 20 is released and the warning alarm is inactivated. In this way, a visual and audio warning will continue to be given to the operator until three successive sweeps of the field of vision of the emitter/sensor 12, 14 do not detect an object 20, a process that takes approximately 375–700 msecs. While the preferred embodiment has an M/N ratio equal to 1:4, lower or higher M/N ratios may be used depending upon the characteristics desired of the warning system.

Finally, in Step 140, an appropriate audio and visual warning is given based on the TTC value determined in Step 120 taking into account the filtering of Step 130. The appropriate audio and visual warning is a function of the lowest TTC value for a given cycle as a function of the distance to a detected object as determined by the individual sensors 12, 14. For instance, if one sensor determines that a detected object is 3 meters away, and a second sensor determines that the same detected object is 4 meters away, the lowest TTC value is a function of the vehicle speed and the 3-meter value. In this way, the TTC value is set equal to the minimum time that the electronic control module 22 calculates for the time-to-collision.

Referring now to FIG. 4, a table indicating the enunciator (audio and visual) warning levels based upon TTC and target distance is illustrated according to a preferred embodiment of the present invention. The table separates parking mode warnings (speeds less than 2 mph) from reversing mode warnings (speeds greater than 2 mph). Types of warnings for reversing mode range include three levels of imminent warnings (Imminent Warnings 1, 2 and 3) and three levels of cautionary warnings (Cautionary Warnings 1, 2 and 3)

having a corresponding audio duty cycle (66% or 33%) and LED group display (inner (I), middle (M), outer (O), or combination) as shown in FIG. 5 below. Associated with these types of warnings, for example, at a speed of 5 miles per hour and a distance to object of 2.5 meters (corresponding to bind #10), FIG. 4 indicates that a R2 warning should be signaled to the driver alert displays 24. An R2 warning, in this example, corresponds to an Imminent Warning 2 level given when the TTC value is calculated between approximately 1 and 1.5 seconds.

Referring now to FIG. 5, a listing of the audio and visual warnings corresponding to FIG. 4 are shown. The listing is displayed to the vehicle operator to allow the operator to customize the audio and visual signals with the imminency of the potential collision. For instance, if the operator only desired a visual flashing warning of the inner, middle and outer LEDs when the TTC is less than 1.5 seconds (corresponding to an R1 or R2 warning level), they may choose the #1 audio and visual grouping. If the operator desires an increasing frequency of sound and visual LED display as TTC decreases, they may choose the #4 audio and visual grouping. The ability to change the frequency of either the audio or visual warning, or both, is of great advantage, in that it can be adjusted with different operators in mind. For instance, a person hard of hearing or visually impaired may desire different signals to indicate an impending collision.

As FIG. 5 indicates, as the likelihood of collision becomes more imminent, the electronic control module 22 transmits a higher frequency audio and visual signal to the drive alert display 24, and possibly changes the LED display by activating a middle or outer LED, or both, in addition to an inner LED. This heightened signal alerts the operator as to the severity of the TTC, thereby allowing the operator to react to avoid the object by stopping, swerving or otherwise avoiding the potential collision. For example, according to FIG. 5, if the #1 visual and audio warning levels are used, and an R2 warning level is indicated, the audio display will be a solid tone for a predetermined time and the visual display will flash at a rate of 5 Hz, with the inner, middle, and outer LED displays flashing. The advantage of the present invention is that the operator receives simple, useful information concerning potential emergency stop situations. The present invention also eliminates long range, low speed nuisance alarms which may confuse operators.

From the foregoing it can be seen that there has been brought to the art a new and improved back-up aid system. While the invention has been described in connection with one embodiment, it will be understood that the invention is not limited to that embodiment. On the contrary, the invention covers all alternatives, modifications, and equivalents as may be included within the spirit and scope of the appended claims. For instance, rather than increasing the frequency of an LED display for the visual signal as a function of the imminency of a potential collision, the visual display can be changed as a function of color, for example, green to yellow to red as the imminency increases, or intensity, having a brighter display as the imminency increases. Also, for example, as opposed to increasing the decibel level of the audio signal as a function of the imminency of a potential collision, the audio signal could be changed as a function of tone or messaging. "Collision possible" or "danger, collision imminent" are possible examples.

What is claimed is:

1. A back-up warning system for use in a vehicle, said warning system comprising:
   an object detection system, wherein said object detection system includes a radar detection system and an ultrasonic sensor system;
   an electronic control module in operative communication with said object detection system, said electronic control module capable of receiving and interpreting signals from said object detection system to determine a first value representing a distance to a target object and for generating a second value representing a rate of change of distance to said target object;
   a drive alert system in operative communication with said electronic control module, said driver alert system outputting a driver alert signal as a function of said first and second value.

2. The warning system of claim 1, wherein said driver alert system includes visual display and a speaker.

3. The warning system of claim 1, wherein said driver alert system includes an LED display for generating a visual display as a function of said driver alert signal.

4. The warning system of claim 1, wherein said driver alert system includes a sound system for generating a plurality of sounds as a function of said driver alert signal.

5. The warning system of claim 1, wherein said driver alert system includes and LED display for generating a visual display as a function of said driver alert signal and wherein said driver alert system includes a sound system for generating a plurality of sounds as a function of said driver alert signal.

6. The warning system of claim 1, wherein said driver alert is an audio driver alert signal and a visual driver alert signal.

7. A method of warning a vehicle operator of a potential collision, the method comprising the steps of:
   generating a first value from an object detection system representing a distance to a detected object, said object detection system comprising a radar detection system and an ultrasonic detection system;
   generating a second value associated with said detected object representing a rate of change of distance to said detected object;
   generating a drive alert signal as a function of said first and second value; and
   communicating said driver alert signal to a driver alert system, said driver alert signal being indicative of a time to collision with said detected object.

8. The method of claim 7, wherein the step of generating a first value comprises the step of receiving a signal from a radar sensor.

9. The method of claim 7, wherein the step of generating a first value comprises the step of receiving a signal from an ultrasonic sensor.

10. The method of claim 7, wherein the step of generating a second value comprises the step of receiving a signal from a vehicle speed sensor.

11. The method of claim 7, wherein the step of generating the first value also includes the steps of:
   assigning said first value to a bin value;
   generating a second driver alert signal as a function of said bin value and second value; and
   communicating said second driver alert signal to a driver alert system, said second alert signal being indicative of said time-to-collision with said detected object.

12. The method of claim 11, further including the steps of generating a visual signal as a function of said second driver alert signal and generating an audio signal as a function of said second driver alert signal.

13. The method of claim 7, further including the step of generating a visual signal as a function of said driver alert signal.

14. The method of claim 7, further including the step of generating an audio signal as a function of said driver alert signal.

15. A method of alerting a vehicle operator of the imminency of a potential collision with an object while backing up, the method comprising the steps of:
   scanning a predetermining field of coverage for an object with an object detection system, said object detection system comprising a radar detection system and an ultrasonic detection system;
   generating a first value from an object detection system representing a distance to said object;
   generating a second value representing a rate of change of distance to said object; and
   generating a time-to-collision value as a function of said first value and said second value; and
   modifying a drive alert as a function of said time-to-collision value.

16. The method according to claim 15, wherein the step of modifying said driver alert comprises the step of modifying said driver alert to signal one of an imminent warning or a cautionary warning, wherein said imminent warning represents a time-to-collision value less than said cautionary warning.

17. The method according to claim 16, further including the step of modifying said driver alert to signal one of a first imminent warning or a second imminent warning, wherein said first imminent warning represents a time-to-collision value less than said second imminent warning.

18. The method according to claim 16, further including the step of modifying said driver alert to signal one of a first cautionary warning or a second cautionary warning, wherein said first cautionary warning represents a time-to-collision value less than said second cautionary warning.

19. The method according to claim 15, wherein the step of modifying said driver alert comprises the step of modifying an LED output as a function of said time-to-collision value.

20. The method according to claim 15, wherein the step of modifying said driver alert comprises the step of modifying a sound system output as a function of said time-to-collision value.

21. The method according to claim 19, wherein the step of modifying said LED output as a function of said time-to-collision value comprises at least one of the following steps: modifying the intensity of the LED output, modifying the frequency of the LED output, modifying the color of the LED output, or modifying the number of diodes in an LED output as a function of said time-to-collision value.

22. The method according to claim 20, wherein the step of modifying said driver alert at least one of the following steps: modifying the decibel level of the sound system output, modifying the frequency of the sound system output, modifying the tone of the sound system output, or modifying the messaging of the sound system output as a function of said time-to-collision value.

* * * * *